United States Patent [19]

Ziolko et al.

[11] Patent Number: 4,827,514

[45] Date of Patent: May 2, 1989

[54] METHOD AND APPARATUS TO DETECT AND RECOVER A PSEUDO-RANDOM SEQUENCE

[75] Inventors: Eric F. Ziolko, Schaumburg; Harry A. Hennen, Woodstock, both of Ill.

[73] Assignee: Motorola, Inc., Schaumburg, Ill.

[21] Appl. No.: 163,684

[22] Filed: Mar. 3, 1988

Related U.S. Application Data

[63] Continuation of Ser. No. 902,829, Sep. 3, 1986, abandoned.

[51] Int. Cl.$^4$ .............................................. H04K 1/04
[52] U.S. Cl. ..................................... 380/48; 375/113; 380/46
[58] Field of Search ............... 375/112, 113, 114, 116, 375/1; 380/48, 46

[56] References Cited

U.S. PATENT DOCUMENTS

| | | | |
|---|---|---|---|
| 3,586,776 | 6/1971 | Salava | 178/69.5 R |
| 3,906,445 | 9/1975 | Beckman et al. | 340/146.1 |
| 3,931,473 | 1/1976 | Ferris, Jr. | 380/48 |
| 4,158,748 | 6/1979 | En | 375/116 |
| 4,243,941 | 1/1981 | Zdunek | 329/50 |
| 4,271,520 | 6/1981 | Coombes et al. | 371/42 |
| 4,411,017 | 10/1983 | Talbot | 455/26 |
| 4,434,323 | 2/1984 | Levine et al. | 178/22.17 |
| 4,477,912 | 10/1984 | Russell | 375/1 |
| 4,484,027 | 11/1984 | Lee et al. | 178/22.17 |
| 4,527,275 | 7/1985 | Russell | 375/1 |
| 4,667,327 | 5/1987 | Bright et al. | 371/47 |
| 4,688,257 | 8/1987 | Erickson | 380/48 |
| 4,697,277 | 2/1985 | Van Rassel | 375/116 |
| 4,719,643 | 1/1988 | Beeman | 375/115 |

OTHER PUBLICATIONS

"Privacy and Authentication: An Introduction to Cryptography", by Whitfield Diffie and Martin E. Hellman, Proceedings of the IEEE, vol. 67, No. 3., Mar. 1979.

*Primary Examiner*—Salvatore Cangialosi
*Attorney, Agent, or Firm*—Thomas G. Berry

[57] ABSTRACT

A synchronization detector is disclosed wherein a portion of the received data stream is parallel loaded into a sequence generating means. The sequence generating means provides a local synchronization sequence that is compared to the transmitted synchronization signal, and an error count is tallied. If the number of errors occurring in a predetermined "window" is below a predetermined threshold, a synchronization detect signal is asserted. However, if the errors in a predetermined window exceed the threshold, the sequence generating means is reloaded with another portion of the received data stream and the process is repeated until the synchronization detect signal is asserted.

15 Claims, 2 Drawing Sheets

METHOD AND APPARATUS TO DETECT AND RECOVER A PSEUDO-RANDOM SEQUENCE

This is a continuation of application Ser. No. 902,829, filed Sept. 3, 1986, now abandoned.

TECHNICAL FIELD

This invention relates generally to synchronous digital communication systems, and more particularly to synchronization detectors used is such systems.

BACKGROUND ART

Synchronous digital communication systems are well known in the art. In such systems, it is known to transmit a synchronization signal either as a preamble or postamble to a data signal, or periodically interleaved within a data message. Receivers operating within these systems must correctly locate and decode the synchronization signal to properly receive the data message.

Prior synchronization schemes have employed fixed length predetermined digital patterns that are stored in the receiver in some convenient memory means. The incoming data stream is compared bit-by-bit to the predetermined digital sequence until the sequence is located and correctly decoded. However, this seemingly simple task is complicated when errors are introduced into the received data stream due to noise, signal path fading, and other adverse signal phenomena. Accordingly, some radio receiver designers have simply relaxed the criteria for detection of the synchronization sequence (for example 13 out of 15 bits). Other receiver designers, desirous of maintaining the higher standard of 100% correlation, have employed error correction means to correct erroneous bits prior to the synchronization detector.

In a secure communication system, the fixed length predetermined synchronization signal is impractical since the goal of a secure communication system is to transmit a bit stream that appears random in nature. Placing a predetermined fixed length synchronization pattern within an encrypted message may compromise the security of the system in that an unauthorized receiver may "focus" on the repeated pattern and extract the encoded data in an attempt to break the particular encryption algorithm employed. Additionally, the fixed length synchronization sequence adds "overhead" to the synchronization process. Therefore, a need exists to provide a reliable synchronization detector that may be used in a synchronization system suitable for a secure communication system.

SUMMARY OF THE INVENTION

Accordingly, it is an object of the present invention to provide an improved secure synchronous communication system.

It is a further object of the present invention to provide a synchronization detector for use in a secure synchronous communication system.

It is another object of the present invention to provide a synchronization detector that recovers the synchronization sequence for use in a decryption device to decrypt an information signal.

Briefly, according to the invention, a portion of the received data stream is loaded in parallel into a sequence generating means. The sequence generating means provides a local synchronization sequence that is compared to the transmitted synchronization signal, and an error count is tallied. If the number of errors occurring in a predetermined "window" is below a predetermined threshold, a synchronization detect signal is asserted. However, if the errors in a predetermined window exceed the threshold, the sequence generating means is reloaded with another portion of the received data stream and the process is repeated until the synchronization detect signal is asserted.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like reference numerals identify like elements, and in which:

DETAILED DESCRIPTION OF THE INVENTION

Figure 1:
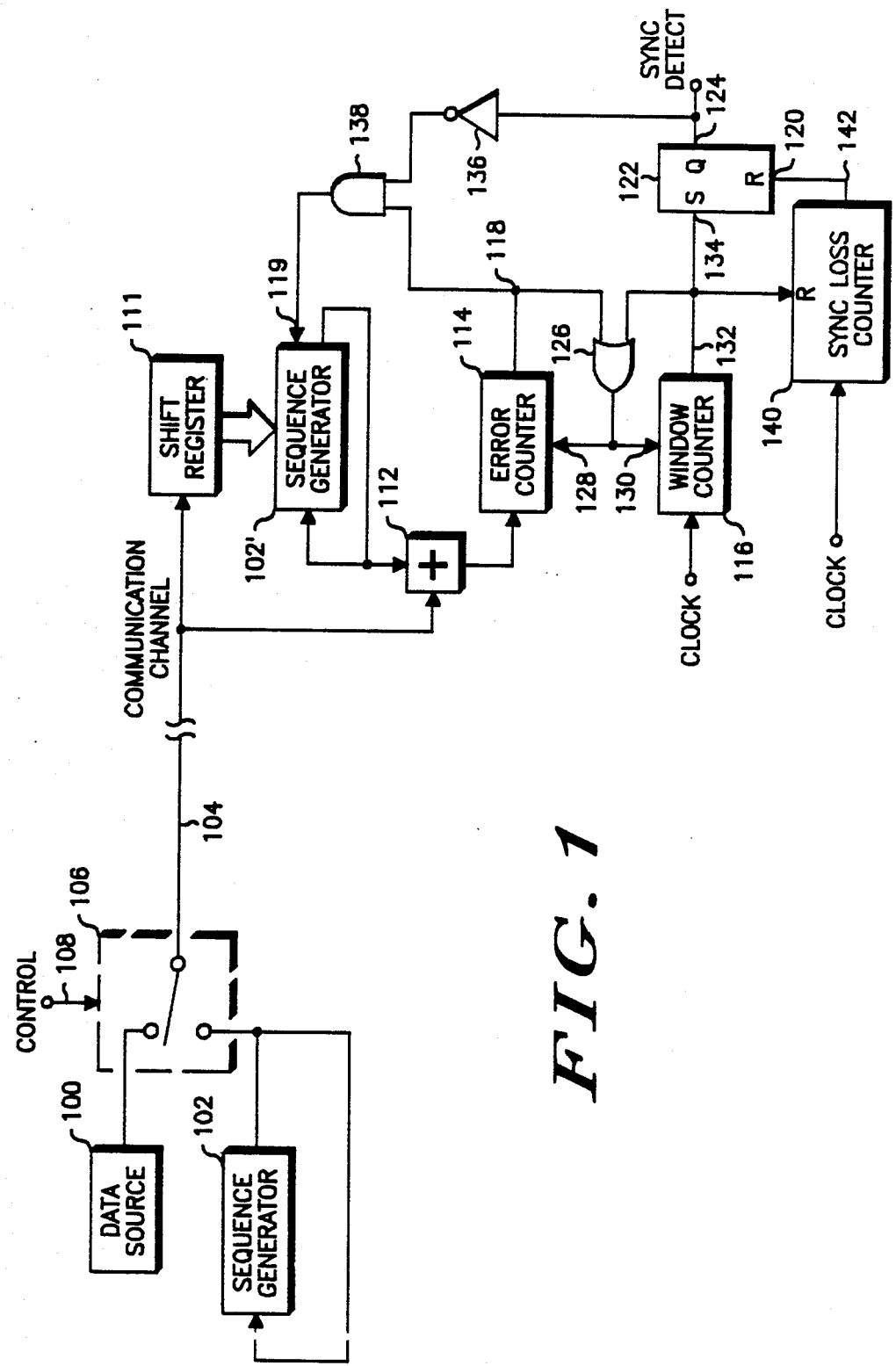
FIG. 1 is a block diagram of the synchronization detector of the present invention.

Referring now to the drawings and in particular to FIG. 1, the sequence detector of the present invention is shown employed in a communication system. At the transmitter, a data source 100 and a sequence generator 102 are multiplexed to a communication channel 104 via a switch 106. The data source 100 may comprise computer data, or may be a digital representation of a voice signal (either encrypted or unencrypted). The switch 106 alternately couples the data source 100 and the sequence generator 102 to the communication channel 104 in response to a control signal 108. The control signal 108 may be generated by a microprocessor or any other suitable means. By appropriate actuation of the control signal 108, the synchronization signal generated by the sequence generator may be used as a preamble or postamble to the data signal, or alternately, may be periodically interleaved within the data signal supplied by the data source 100. In the preferred embodiment of the present invention, 256 bits of the synchronization sequence are transmitted.

At the receiver, the synchronization signal and the data signal are received and the combined data stream is provided to a shift register 111. The shift register 111 parallel loads at least a portion of the received data stream to a sequence generator 102'. The sequence generators 102 and 102' are preferably identical since the sequence must be known by both the transmitter and receiver to correctly decode the data on the channel. Preferably, the sequence appears random or pseudo-random and is such that by knowing a small portion of the sequence, and the rules for how it is derived, the entire sequence may be computed at the receiver. Those skilled in the art will appreciate that if the synchronization bits that define the logical state of the sequence generator have been properly loaded into the sequence generator 102', both of the sequence generators will be providing the exact same sequence. The locally generated synchronization sequence provided by the generator 102' and the received data stream are compared in an adder 112. Preferably, the adder 112 is a modulo two adder and may be represented as an exclusive OR gate such as an MC14071B manufactured by Motorola, Inc., or its functional equivalent. If the local sequence and the received sequence are identical, the output of the adder 112 will be at a logical "zero" state. Alternately, if the local synchronization sequence and the data stream are dissimilar the output of the adder 112 will be at a logical "one" state. The locally generated sequence and the received sequence may not be identical for several reasons, including, an error in the received data stream, or that the sequence generator 102' has not been loaded with synchronization bits from the received data stream.

When the output of the adder 112 is at the logical one state, an error has been detected between the received data steam and the locally generated sequence. This output is coupled to an error counter 114, which counts the number of times that the local sequence and the received sequence do not match. Contemporaneously, a second counter 116 is counting clock cycles to form a "window" counter as is known in the art. If the error counter 114 reaches its predetermined count limit, it will generate an output pulse on its output line 118. Output line 118 is operably coupled to the parallel load port 119 of the sequence generator 102' through an AND gate 138. The other input of the AND gate 138 is connected to an inverter 136, which is coupled to the synchronization detect output 124 of the flip-flop 122. If the output 124 of the flip-flop 122 is at a logical zero state, synchronization has not been detected. These connections operates to control when the sequence generator 102' is reloaded with more received data bits from the shift register 111. Preferably, the flip-flop 122 is an MC14013B, manufactured by Motorola, Inc., or its functional equivalent. Lastly, the signal 118 is coupled to an OR gate 126, which in turn is a reset port 128 on the error counter 114 and a reset port 130 on the window counter 116. These connections operate to reset the counters to a logical zero state so that the detection process may begin again.

Assuming now that the window counter 116 reaches its predetermined count threshold prior to the error counter 114 asserting its output signal 118, the synchronization detect signal 124 will be asserted when the window counter 116 asserts its output control line 132. The control line 132 is coupled to the "set" port 134 of the flip-flop 122, which operates to raise the Q output port 124 to a logical one level, thereby asserting the synchronization detect signal, which may be coupled to any such subsequent circuitry as may be employed in a particular receiver. The asserted synchronization detect signal inhibits any further parallel loads of the sequence generator 102' by placing a logical zero on the AND gate 138 via the inverter 136. The control signal 132 is also coupled to the OR gate 126, which resets the error counter 114 and the window counter 116 via reset ports 128 and 130 respectively.

Once the sequence generators 102 and 102' are "in sync", some means must be provided to detect sync loss and to return to the detection mode to attempt to recover synchronization. In the preferred embodiment of the present invention, a synchronization loss signal 142 is provided by a synchronization loss counter 140. Operationally, the synchronization loss counter 140 counts clock pulses on asserts its output signal 142 when it reaches a predetermined threshold. Normally, the synchronization counter 140 is reset by the window counter via signal 132. However, in the event that synchronization is not maintained, the synchronization counter 140 will reach its predetermined threshold before being reset and will assert the signal 142. Synchronization loss signal 142 is coupled to the reset port 120 of the flip-flop 122. When asserted, the synchronization loss signal 142 operates to reset the flip-flop 122 thereby enabling the error counter 114 to parallel load the sequence generator 102' via the AND gate 136. Alternately, the synchronization counter 140 could be replaced by a time-out-timer to begin parallel loads after a predetermined time interval. Also, a predetermined end-of-message signal could be transmitted and detected to resume parallel loading. Of course, any combination of these techniques may be used in any particular implementation.

The parallel loading by the present invention, of the sequence generator 102' allows the entire length of the shift register 111 to be loaded in the time it takes to clock in one bit of the received data stream. Accordingly, if the error counter 114 reaches its predetermined threshold in N clock cycles (or less), where N is the length of the shift register 111, the receiver will not "lose" any received bits while determining whether or not the receiver is synchronized. In the preferred embodiment of the present invention, the length of the shift register 111 is, at a minimum, equal to the length of the window counter 116. This "covers" any received or locally generated errors during the verification interval (defined by the length of the window counter; 48 bits in the preferred embodiment) without having to reload or "clear" all of the sequence generator. Therefore, the minimum length of the transmitted synchronization sequence is equal to the length of the sequence generator 102' and the window counter 116. In the preferred embodiment, 256 bits are transmitted, which is approximately twice the minimum length. This allows for multiple synchronization attempts, per any given time period, than that of the prior art. As previously mentioned, the preferred sequence appears random or psuedo-random and will quickly diverge to a noiselike signal if the receiver is not synchronized. Typically, the error signal 118 may be asserted (on the average) in 2X bits, where X is the error threshold ($X=4$ in the preferred embodiment and one bit equals one error). Thus, the parallel loading of the present invention affords both a time savings and improved performance over synchronization detectors of the prior art since the sequence generator 102' need not be completely reloaded with bits from the incoming data stream after each synchronization attempt.

Figure 2A:
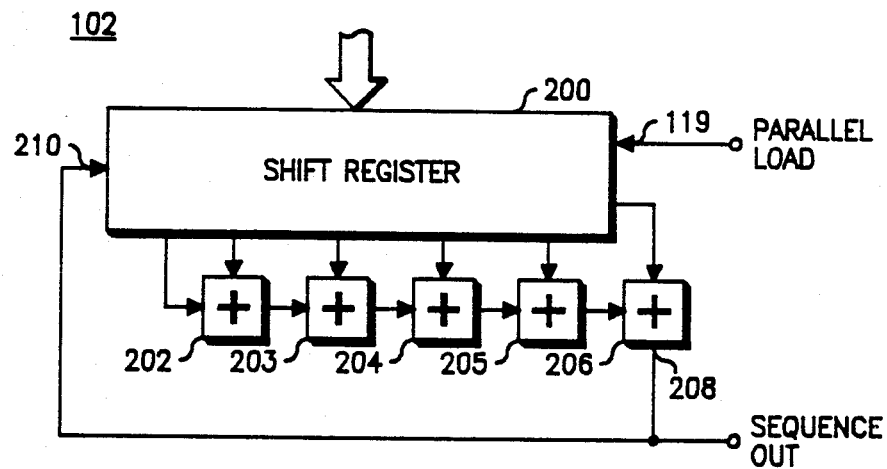
FIG. 2a is an embodiment of the sequence generator of FIG. 1.
Figure 2B:
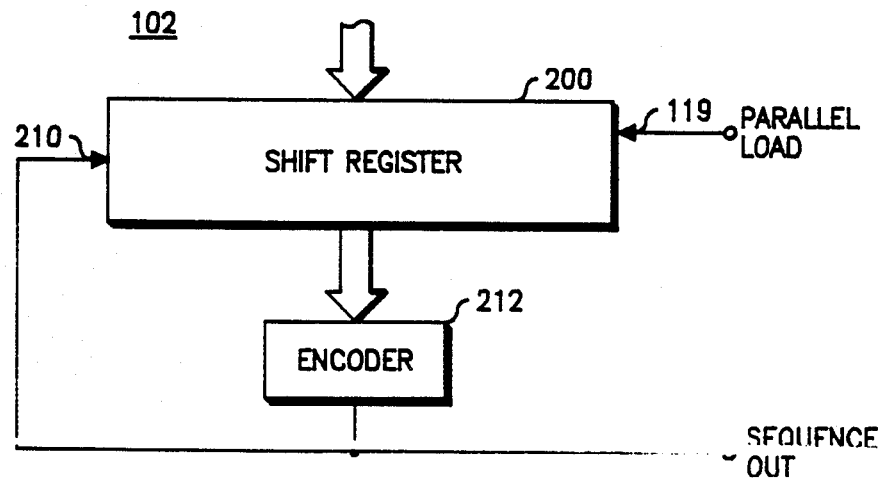
FIG. 2b is an alternate embodiment of the sequence generator of FIG. 1.

Referring now to FIGS. 2a and 2b, the sequence generator 102 (or 102') is shown. In FIG. 2a, a shift register 200 has selected output ports coupled to a plurality of summers 202-206. The shift register 200 is loaded in parallel with an initialization vector at the transmitter, and with received bits at the receiver via the shift register 111 (see FIG. 1). Preferably, the shift register 111 (see FIG. 1). Preferably, the shift register 200 is comprised of at least one MC14035B, manufactured by Motorola, Inc., or its functional equivalent. After being parallel loaded, the shift register operates serially via the summers 202-206 and the serial input port 210. Preferably, the summers 202-206 are exclusive OR gates such as an MC14070B manufactured by Motorola, Inc., or its functional equivalent. The output signal 208 of the last summer 206, provides the output sequence. Also, the signal 208 is coupled to the input of the shift register 210. Those skilled in the art will appreciate that this configuration forms a linear feedback shift register (LFSR). The output sequence of an LFSR is $2^M-1$, where M is the length of the shift register 200. In the preferred embodiment of the present invention, M=64, which provides a sequence having $1.84 \times 10^{19}$ bits, of which only 256 is transmitted. By judicious selection of the output ports (or taps) the sequence may be made maximal length. Moreover, proper tap selection may provide an orthogonal or semiorthogonal code that is inherently redundant and suitable for majority logic error correction. Such a sequence generator is described in U.S. Pat. No. 4,667,327. The sequence generator of FIG. 2a provides an output sequence that is essentially pseudo-random in nature, and thus is suitable for use in a secure communication system. Since the transmitter and receiver synchronization generator are preferably identical, the only requirement is to send enough bits to fill the length of the register. If the entire length of the register is transmitted and correctly loaded in the sequence generator 102', thereafter both the sequence generator 102 and the sequence generator 102' should generate the identical sequence since the rules for the sequence creation (i.e., the taps and the summer configurations) are identical.

In FIG. 2b, an alternate embodiment of the sequence generator 102 is shown. The shift register 200 is loaded in parallel from the shift register (see FIG. 1) by asserting the parallel load port 119. Preferably, the shift register 200 is comprised of at least one MC14035B, manufactured by Motorola, Inc., or its functional equivalent. The received bits in the shift register 200 are parallel loaded into an encoder 212. The encoder 212 may be an encryption device or may be any other suitable encoder as a particular embodiment may choose. The output of the encoder 212 provides the output sequence (i.e., synchronization signal) and additionally may provide the input signal 210 to the shift register 200. Therefore, if the initial sequence is not random in nature, it may be made random or pseudo-random by being processed by the encoder 212. In a secure communication system, the transmitter and receiver are already provided with a crypto device. Accordingly, the encoder 212 may simply route the contents of the shift register 200 through the crypto device already resident in the transmitter and receiver.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. A method for detecting and recovering a psuedo-random synchronization sequence from a received data stream comprising at least a portion of said pseudo-random sequence and an information signal, said method comprising the steps of:
    (a) loading, in parallel, at least a portion of the data stream into a pseudo-random sequence generating means;
    (b) generating a pseudo-random sequence;
    (c) comparing at least a portion of said pseudo-random sequence to at least a portion of the data stream to provide an error indication;
    (d) providing a detection signal if said error indication is at least below a predetermined threshold.

2. The method of claim 1, which includes the step of:
    (e) repeating steps (a) through (d) if said error indication is above said predetermined threshold.

3. The method of claim 1, wherein step (a) comprises the steps of:
    (a1) loading, serially, at least a portion of the data signal into a storage means to provide a temporary signal;
    (a2) transferring, in parallel, at least a portion of said temporary signal into said pseudo-random sequence generating means.

4. The method of claim 1, wherein said comparing step comprises the step of summing, modulo two, said at least a portion of the data stream and said at least a portion of said pseudo-random sequence.

5. A method for detecting and recovering a pseudo-random synchronization sequence from a received data stream comprising at least a portion of said pseudo-random sequence and an information signal, said method comprising the steps of:
    (a) loading, serially, at least a portion of the data signal into a storage means to provide a temporary signal;
    (b) transferring, in parallel, at least a portion of said temporary signal into a pseudo-random sequence generating means;
    (c) generating a pseudo-random sequence;
    (d) comparing, by modulo two addition, at least a portion of said pseudo-random sequence to at least a portion of the data stream to provide an error indication;
    (e) providing a detection signal if said error indication is at least below a predetermined threshold.

6. In a synchronous communication system, which transmits a data signal comprising at least a portion of a pseudo-random synchronization sequence and an information signal, a method for detecting and receiving said pseudo-random synchronization sequence, comprising the steps of:
    at the transmitter:
        (a) generating a first pseudo-random synchronization sequence;
        (b) transmitting the data signal comprising at least a portion of said first pseudo-random synchronization signal and an information signal;
    at the receivers:
        (a) receiving the transmitted data signal to provide a received signal;
        (b) loading, in parallel, at least a portion of said received signal into a sequence generating means;
        (c) generating a second pseudo-random synchronization sequence;
        (d) comparing at least a portion of said second pseudo-random synchronization sequence to at least a portion of said received signal to provide an error indication;
        (e) providing a synchronization detection signal if said error indication is at least below a predetermined threshold.

7. The method of claim 6, which includes the step of:
    (f) repeating steps (a) through (e) if said error indication is above said predetermined threshold.

8. The method of claim 6, wherein receiver step (a) comprises the steps of:
    (a1) loading, serially, at least a portion of said received signal into a storage means to provide a temporary signal;

(a2) transferring, in parallel, at least a portion of said temporary signal into said pseudo-random sequence generating means.

9. The method of claim 6, wherein transmitter step (a) comprises transmitting said at least a portion of said first pseudo-random synchronization sequence as a preamble to said data signal.

10. The method of claim 6, wherein transmitter step (a) comprises transmitting said at least a portion of said first pseudo-random synchronization sequence as a postamble to said data signal.

11. The method of claim 6, wherein transmitter step (a) comprises interleaving said at least a portion of said first pseudo-random synchronization sequence with said information signal.

12. The method of claim 6, wherein receiver step (d) comprises the step of summing, modulo two, said at least a portion of said received signal and said at least a portion of said second pseudo-random synchronization sequence.

13. An apparatus for detecting and recovering a pseudo-random synchronization sequence from a received data stream comprising at least a portion of said pseudo-random sequence and an information signal, said apparatus comprising:
 (a) loading means for loading, in parallel, at least a portion of the data stream into a pseudo-random sequence generating means;
 (b) said pseudo-random sequence generating means for generating a pseudo-random sequence;
 (c) means for comparing at least a portion of said pseudo-random sequence to at least a portion of the data stream to provide an error indication;
 (d) means for providing a detection signal if said error indication is at least below a predetermined threshold.

14. The apparatus of claim 13, wherein said loading means comprises:
 (a1) means for loading, serially, at least a portion of the data signal into a storage means to provide a temporary signal;
 (a2) means for transferring, in parallel, at least a portion of said temporary signal into said pseudo-random sequence generating means.

15. An apparatus for detecting and recovering a pseudo-random synchronization sequence from a received data stream comprising at least said pseudo-random sequence and an information signal, said apparatus comprising:
 (a) means for loading, serially, at least a portion of the data signal into a storage means to provide a temporary signal;
 (b) means for transferring, in parallel, at least a portion of said temporary signal into a pseudo-random sequence generating means;
 (c) said pseudo-random generating means for generating a pseudo-random sequence;
 (d) means for comparing, by modulo two addition, at least a portion of said pseudo-random sequence to at least a portion of the data stream to provide an error indication;
 (e) means for providing a detection signal if said error indication is at least below a predetermined threshold.

* * * * *